J. D. TEW.
COLLAPSIBLE FORMER FOR BUILDING TIRE CASINGS.
APPLICATION FILED JUNE 27, 1913.
1,198,790. Patented Sept. 19, 1916.
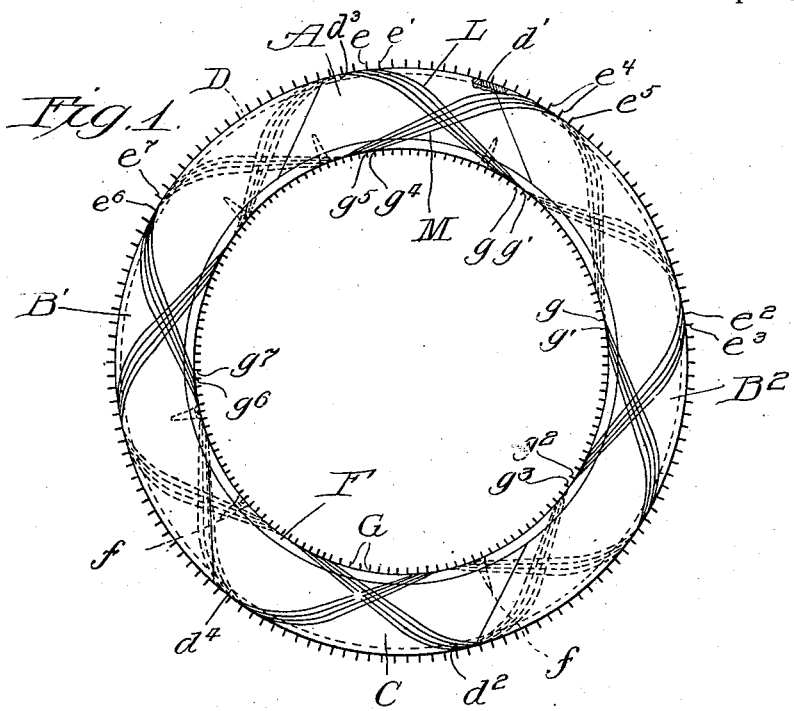
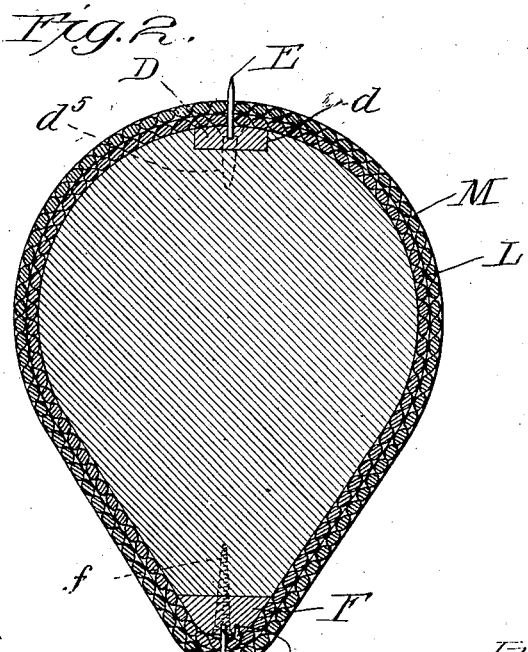

UNITED STATES PATENT OFFICE.

JAMES D. TEW, OF AKRON, OHIO.

COLLAPSIBLE FORMER FOR BUILDING TIRE-CASINGS.

1,198,790.   Specification of Letters Patent.   Patented Sept. 19, 1916.

Application filed June 27, 1913. Serial No. 776,060.

*To all whom it may concern:*

Be it known that I, JAMES D. TEW, a citizen of the United States, residing at Akron, in the county of Summit and State of Ohio, have invented certain new and useful Improvements in Collapsible Formers for Building Tire-Casings, of which the following is a specification.

My invention relates in general to the manufacture of pneumatic tire casings, and more particularly to an improved collapsible former for use in building pneumatic tire casings of the "cord" type preparatory to vulcanizing such casings.

In order that pneumatic tire casings of the type comprising reinforcing layers of cords may be efficient and durable in use, it is essential that the cords should be securely anchored in the casings and retained under uniform tension so as to impart to the tire maximum strength and low internal friction. The degree of perfection of the completed tire, therefore, largely depends upon the cords in each layer thereof being laid at the same predetermined angle to the tread of the casing and under equal tension, and also upon the individual cords being securely anchored in the beads at the inner peripheries of the sides of the casing, so as to prevent all movement of the cords relatively to each other and to the other materials of the casing.

The primary object of my invention is to provide a former for building tire casings of the cord type upon which the various elements of the casing may be conveniently and efficiently assembled, and which particularly will insure the layers of the cords being laid uniformly with relation to each other and being retained in the completed tire under equal tension.

A further object of my invention is to provide a collapsible former for building tire casings of the cord type around which the cord may be continuously wound in uniform convolutions to form the reinforcing layers of cord, and which may be readily removed from within the tire casing built thereon to permit the subsequent vulcanization of the casing.

A still further object of my invention is to provide a collapsible former for use in constructing tire casings, which will be simple in construction, which may be conveniently removed from the casing built thereon, and which will be efficient in use.

My invention will be more fully disclosed hereinafter with reference to the accompanying drawing, in which the same is illustrated as embodied in a convenient and practical form, and in which—

Figure 1 is a side elevational view of the former with a portion of the two layers of cord windings indicated thereon; and Fig. 2, a cross sectional view on an enlarged scale through the former and through the two layers of cord wound thereon.

The same reference characters are used to designate the same parts in the two figures of the drawing.

Reference characters A, B', B² and C designate sections of my improved former, such sections when assembled—as shown in Fig. 1—making an annular former of the cross section and dimensions desired for the tire casing to be built thereon.

One of the sections A of the former is provided with inwardly diverging ends which engage complementally inclined ends on the adjoining sections B' and B² of the former. The section C is also provided with inwardly diverging inclined ends which engage complementally inclined surfaces on the ends of the sections B', B² opposite to the ends which engage the section A.

D designates a circular ring of a diameter to surround the outer periphery of the former when the sections thereof are assembled. In order to retain the ring D in engagement with the outer periphery of the sections of the former, a longitudinal groove *d* is preferably formed in the periphery of the former of a cross section conforming to that of the ring D, so that the latter may fit within the same, as shown in Fig. 2. The outer surface of the ring D is of a transverse curvature conforming to the curvature of the outer periphery of the former. The ring D is preferably made in sections corresponding in number to the sections of the former. The sections of the ring D secured to the side members B' and B² of the former, project slightly beyond the ends of said sections of the former so as to overlie the adjacent ends of the intermediate sections A and C of the former. By reference to Fig. 1 of the drawing, it can be seen that one end of the section of the ring D which is secured to the section B² of the former, extends at $d'$ over the adjacent end of the section A of the former, while the opposite end of the section of the ring D, which is secured to the section B² of the former, projects to the point $d^2$ over the adjacent end of the section C of the former. In a similar manner the opposite ends of the section of the ring D, which is secured to section B' of the former, extends beyond the ends of said section of the former to the points designated $d^3$ and $d^4$, so that said section of the ring D overlaps the adjacent ends of the sections A and C of the former. Any suitable fastening device such, for instance, as screws $d^5$, secure the sections of the ring D within the groove $d$, formed in the outer surface of the sections of the former. Secured to and projecting radially from the ring D are pins E uniformly spaced with relation to each other.

F designates a ring having an exterior diameter equal to the interior diameter of the former when the sections thereof are in alined relation, as shown in Fig. 1. The outer surface of the ring F is preferably flat so as to be movable laterally into and out of position within the sections of the former. The ring F is detachably retained in position within the former by any suitable fastening devices, such, for instance, as spaced screws $f$. A groove H is formed in the inner periphery of the ring F to facilitate cutting the convolutions of the cords, as will subsequently be described. Secured to and projecting radially inwardly from the ring F are pins G uniformly spaced with relation to each other, and corresponding in number to the pins E projecting outwardly around the ring D.

The manner of using my improved collapsible former is as follows: The sections are placed in alinement with each other to form a complete circle with the adjoining ends of the sections in direct engagement with each other. The sections A and C are engaged with the ends of the sections of the ring D which project beyond their opposite ends, whereby the sections of the former are maintained in circular alinement with each other. The inner ring F is then moved laterally to a position around the inner periphery of the former, so as to retain the sections thereof in alinement preparatory to having a tire casing built thereon. The screws $f$ are then inserted through the ring F into engagement with the respective sections so as to retain the former in condition for use. A cord L is then wound around the former in continuous convolutions so as to form a layer completely surrounding the former. The outer and inner rows of pins serve to retain the successive convolutions at the desired angle to each other and to the former. For instance, the cord L is placed between the outer adjacent pins $e$ and $e'$ and then passed around through the former between the adjacent inner pins $g$ and $g'$. The cord is then passed around the outer surface of the former between the adjacent outer pins $e^2$ and $e^3$, and thence through the former again between the adjacent inner pins $g^2$ and $g^3$. In this manner the winding of the cord L continues until a layer of convolutions has been formed completely around the former. An outer layer of cord is then wound around the inner layer, but with the convolutions thereof inclined in an opposite direction, so that the planes of the convolutions of the outer layer intersect the planes of the convolutions of the inner layer. For instance, the cord M is placed between the adjacent outer pins $e^4$ and $e^5$ and then passed through the former between the pins $g^4$ and $g^5$, and thence around the outer periphery of the former between the adjacent pins $e^6$ and $e^7$. The winding then continues inwardly around the former between the adjacent inner pins $g^6$ and $g^7$. In this manner a second layer of cord is formed around the former, and if desired, other layers of cord may be formed in the same manner by winding the cord around the former with the convolutions of each layer crossing the convolutions of the overlying and underlying layers. The pins which project radially outwardly from the ring D and radially inwardly from the ring F, retain the convolutions of cord in proper spaced relation and enable the cord to be wound around the former under equal tension throughout all of the convolutions. The building up of the tire casing is then continued by applying beads on the opposite sides of the layer adjacent the inner periphery of the former and the application of rubber to the sides and around the tread. These parts are not shown, as they are unnecessary in order that the construction and method of using my improved collapsible former may be fully understood. After the entire casing has been built up around the former, the layers of cord are severed along the inner periphery of the former which may be facilitated by the groove H in the inner periphery of the inner ring F which serves as a guide for a knife used in severing the successive convolutions of cord forming the layers. The inner severed ends of the cords in the layers are then folded outwardly so as to permit the removal of the inner ring F which is accomplished by taking out the screws $f$ and then moving the ring laterally from its position within the sections of the former. The section A of the former is then moved inwardly, thereby disengaging the same from the tire casing, after which the section C may be similarly removed. The sections B', B² may then be moved inwardly and also disengaged from the built-up tire casing. The sections of the former may then be assembled in alinement by means of the outer and inner rings preparatory to using the same for building another tire casing thereon.

From the foregoing description it will be observed that I have invented an improved former for use in building pneumatic tire casings of the cord type, by means of which the cord forming the layers may be conveniently and accurately arranged in convolutions uniformly arranged with relation to each other and at the same angle with relation to the casing. It will be further observed that by the use of my improved former an equal tension may be imparted to the convolutions of the cord forming the layers, thereby materially contributing to the durability and efficiency of the tire casing when completed. The construction of my improved former is such as to permit it to be readily removed from the casing built thereon, and the parts thereof again assembled in operative relation for re-use.

What I claim is:

1. A collapsible annular former for building tire casings, having a longitudinal series of outwardly projecting equi-distant pins around the outer periphery thereof, and a longitudinal series of inwardly projecting equi-distant pins around the inner periphery thereof.

2. The combination with a collapsible former for building tire casings, comprising a plurality of inwardly separable sections, of means for supporting a longitudinal series of outwardly projecting pins on the outer periphery of said former, and a removable ring fitting within the inner periphery of said former and carrying a longitudinal series of inwardly projecting pins.

3. The combination with a collapsible former for building tire casings, comprising a plurality of inwardly separable sections, of a ring surrounding the outer periphery of said sections and carrying a longitudinal series of outwardly projecting pins, and a removable ring fitting within the inner periphery of said former and carrying a longitudinal series of inwardly projecting pins.

4. The combination with a collapsible former for building tire casings, comprising a plurality of inwardly separable sections having a continuous longitudinal groove in their outer peripheries, of a ring surrounding the outer periphery of the sections of said former and seated within said groove, a series of outwardly projecting pins carried by said ring, a removable ring fitting within the inner periphery of said former, and a longitudinal series of inwardly projecting pins carried by said second ring.

5. The combination with a collapsible former for building tire casings, comprising a plurality of inwardly separable sections, of means for supporting a longitudinal series of outwardly projecting pins on the outer periphery of said former, a laterally removable ring fitting within the inner periphery of said former for retaining the sections thereof in alined relation, means for detachably securing said ring to the inner peripheries of the sections of the former, said ring having a longitudinal groove in its inner surface, and a longitudinal series of inwardly projecting pins carried by said ring.

6. The combination with a collapsible former for building tire casings, comprising a plurality of movable separable sections, having a continuous longitudinal groove in their outer surfaces, of a ring surrounding the outer periphery of said sections and seated within said groove, a longitudinal series of outwardly projecting pins carried by said ring, a laterally movable inner ring fitting within said former and retaining the sections thereof in engagement with said outer ring, means for detachably securing said inner ring to the several sections of the former, and a longitudinal series of inwardly projecting pins carried by said inner ring.

7. A collapsible annular former for building tire casings, having a longitudinal series of projections extending radially around the outer periphery thereof.

8. A collapsible annular former for building tire casings, having a longitudinal series of projections extending radially inward around the inner periphery thereof.

9. A collapsible annular former for building tire casings having a longitudinal series of projections extending radially outward around the outer periphery thereof and a longitudinal series of projections extending radially inward around the inner periphery thereof.

10. A collapsible annular former for building tire casings provided with detachable circumferentially extending means for carrying a longitudinal row of equi-distant pins around its outer periphery.

11. A collapsible annular former for building tire casings provided with detachable circumferentially extending means for carrying a longitudinal row of equi-distant pins around its inner periphery.

12. A collapsible annular former for building tire casings having detachable circumferentially extending means for carrying a longitudinal row of equi-distant projecting pins adapted to properly space cords around about the former.

13. A collapsible annular former having a row of equi-distant pins on its outer periphery and a row of equi-distant pins on its inner periphery, there being substantially the same number of pins in the two rows.

14. The combination, with a collapsible former for building tire casings comprising a plurality of inwardly separable sections having a continuous longitudinal groove in their outer peripheries, of a ring surrounding the outer periphery of the sections of said former and seated within said groove, and a series of outwardly projecting pins carried by said ring.

15. A collapsible annular former for building tire casings provided with a peripheral groove, and a ring adapted to seat in said groove and having projecting pins.

16. A former for building tire casings, said former being provided with two differently positioned longitudinal rows of equidistant pins, the pins of one row being spaced differently from those of the other row.

JAMES D. TEW.

Witnesses:
J. V. Blake,
C. M. Wylie.